United States Patent [19]

Klco

[11] Patent Number: 4,836,856

[45] Date of Patent: Jun. 6, 1989

[54] STABILIZING ROAD BASE COMPOSITION AND METHOD FOR PREPARING SAME

[75] Inventor: Kenneth S. Klco, Cotopaxi, Colo.

[73] Assignee: Domtar, Inc., Montreal, Canada

[21] Appl. No.: 155,373

[22] Filed: Feb. 12, 1988

[51] Int. Cl.$^4$ .................. C04B 11/00; F01C 21/00
[52] U.S. Cl. .................... 404/76; 404/27; 106/109; 106/114
[58] Field of Search ............... 106/104, 114; 404/27, 404/76, 75

[56] References Cited

U.S. PATENT DOCUMENTS

| | | | |
|---|---|---|---|
| 781,079 | 1/1905 | Loebell | 404/76 |
| 1,068,048 | 7/1913 | Ellis | 404/76 |
| 1,069,029 | 7/1913 | Robeson | 404/76 |
| 1,075,856 | 10/1913 | Robeson | 404/76 |
| 1,424,308 | 8/1922 | Hurt | 404/76 |
| 2,314,181 | 3/1943 | WinterKorn | 404/76 |
| 2,357,124 | 8/1944 | Miller | 404/76 |
| 2,375,019 | 5/1945 | Miller | 404/76 |
| 2,937,581 | 5/1960 | Havelin et al. | 404/76 |
| 3,182,973 | 2/1963 | Van der Sluis | 404/76 |
| 3,368,356 | 2/1968 | Graf . | |
| 3,817,643 | 6/1974 | Azar et al. | 404/76 |
| 4,001,033 | 1/1977 | Anthone et al. . | |
| 4,036,659 | 7/1977 | Stude . | |
| 4,252,568 | 2/1981 | Bounini . | |
| 4,259,456 | 11/1977 | DeRooy et al. | 106/114 |
| 4,443,260 | 4/1984 | Miyoshi et al. . | |
| 4,457,781 | 7/1984 | Palmer et al. . | |

OTHER PUBLICATIONS

"Stabilization: Exacting Act, Roadbuilding Bargain", *Highway & Heavy Construction,* Feb. 1979, pp. 30–33.

*Primary Examiner*—William R. Dixon
*Assistant Examiner*—David M. Brunsman
*Attorney, Agent, or Firm*—Brumbaugh Graves Donohue & Raymond

[57] ABSTRACT

A composition for preparing a stabilizing road base and method for preparing same. The composition and method for preparing same comprise 30–50% by volume of gypsum fines having a diameter of less than one inch, 30–70% by volume of at least one aggregate having a diameter of less than one inch and 0–40% by volume of soil mixed into a substantially homogeneous mixture, the mixture having less than 14% by volume of particles with a diameter of less than 0.02 inch. The mixture is saturated with at least one lignosulfonate so that the lignosulfonate substantially coats the gypsum fines, the aggregate and the soil. The invention also discloses a road having a stabilizing road base and method for preparing same.

17 Claims, No Drawings

STABILIZING ROAD BASE COMPOSITION AND METHOD FOR PREPARING SAME

FIELD OF THE INVENTION

This invention relates to a stabilizing road base and method for preparing same. In particular, this invention relates to a stabilizing road base prepared by saturating a substantially homogeneous mixture of gypsum fines, aggregate and soil with at least one lignosulfonate to substantially coat the gypsum fines, aggregate and soil.

BACKGROUND OF THE INVENTION

Various treatments have been proposed to stabilize soils and roads subject to washboarding, dusting and loss of moisture retention. Materials commonly used include calcium chloride, grouping materials and sodium silicates.

Lignosulfonate has also been used as a stabilizing agent. This material is a waste product produced in large quantities by the sulfite pulping process. Lignosulfonate, however, has not been widely used because it does not evenly impregnate soils leaving untreated areas subject to washboarding, dusting and loss of moisture retention. It is also found that lignosulfonates leach out of the soil quickly under cycles of wet and dry weather, requiring substantial road grader maintenance and reapplication of lignosulfonate.

SUMMARY OF THE INVENTION

In order to overcome these difficulties, it is an object of this invention to provide a stabilizing road base, comprising a substantially homogeneous mixture of gypsum fines, aggregate and soil saturated with at least one lignosulfonate, to reduce washboarding, rutting, dusting and general road grader maintenance.

It is also an object of this invention to provide a particular composition to reduce the slickness of a stabilizing road base.

It is a further object of this invention to provide a means to rejuvenate the stabilizing road base to extend its life.

Broadly stated, the invention is directed to a method for preparing a stabilizing road base comprising mixing 30-50% by volume of gypsum fines having a diameter of less than one inch, 30-70% by volume of at least one aggregate having a diameter of less than one inch and 0-40% by volume of soil to obtain a substantially homogeneous mixture of gypsum fines, aggregate and soil, said mixture having less than 15% by volume of particles with a diameter of less than 0.02 inch. In addition to the above, admixing to said mixture at least one lignosulfonate diluted in an amount to saturate said mixture so that said at least one lignosulfonate substantially coats said gypsum fines, aggregate and soil.

The invention is also directed to a composition for a stabilizing road base comprising a substantially homogeneous mixture of 30-50% by volume of gypsum fines having a diameter of less than one inch, 30-70% by volume of at least one aggregate having a diameter of less than one inch, and 0-40% by volume of soil, said mixture having less than 15% by volume of particles with a diameter of less than 0.02 inch. This mixture is saturated with at least one lignosulfonate so that said at least one lignosulfonate substantially coats said gypsum fines, said aggregate and said soil.

The invention is also directed to a road having a stabilizing road base, said stabilizing road base comprising a substantially homogeneous mixture of 30-50% by volume of gypsum fines having a diameter of less than one inch, 30-70% by volume of at least one aggregate having a diameter of less than one inch, and 0-40% by volume of soil, said mixture having less than 15% by volume of particles with a diameter of less than 0.02 inch. This mixture is saturated with at least one lignosulfonate so that said at least one lignosulfonate coats said gypsum fines, said aggregate and said soil.

The invention is further directed to a method for preparing a stabilizing road base on a road comprising mixing 30-50% by volume of gypsum fines having a diameter of less than one inch, 30-70% by volume of at least one aggregate having a diameter of less than one inch and 0-40% by volume of soil to obtain a substantially homogeneous mixture, said mixture having less than 15% by volume of particles with a diameter of less than 0.02 inch. In addition to the above, admixing to said mixture at least one lignosulfonate diluted in an amount to saturate said mixture so that said at least one lignosulfonate substantially coats said gypsum fines, said aggregate and said soil.

It has been found in the present invention, that the application of at least one lignosulfonate in order to saturate a substantially homogeneous mixture of gypsum fines, aggregate and soil results in a stabilizing road base which could be used as a stabilizing finish roadway surface for unpaved roadways and shoulders of paved roadways. The stabilizing finish roadway surface reduces washboarding, rutting, dusting and general road grader maintenance.

A lignosulfonate is a metallic sulfonate salt generally obtained as a waste liquor from sulfite pulp mills. Lignosulfonates are available as salts of ammonium and most metals (e.g. calcium, sodium, magnesium, zinc, iron).

In general, gypsum fines are naturally occurring evaporitic sediments removed from gypsum ore during crushing and screening operations. The sediments are less than one inch in diameter, preferably less than $\frac{3}{8}$ inch. The gypsum fines are generally composed of at least 70% dihydrous calcium sulfate, with the remainder being impurities such as calcium carbonate, magnesium carbonate and aluminum silicates.

By the term "diameter of less than x inch" is generally meant a rock, mineral, particle that will pass through a sieve having square openings whose sides are equal to x inch.

By the term "aggregate" is generally meant crushed stone, lightweight aggregates, sand and gravel, and slag. These industrial minerals and rocks in particular provide abrasiveness, bulk and strength to various mixes. Crushed and broken stone may be: silica based rock material such as granite, chert, graywacke, quartzite and sandstone; carbonate based rock material such as marble, coral, dolomite and limestone; aluminum based rock material such as felsite, syenite and alum stone; and potassium based rock material such as feldspar and greensand.

Lightweight aggregates include a variety of mineral and rock materials generally used to provide bulk and abrasiveness in construction materials. They are distinguished from other mineral aggregate materials by their lighter unit weight: 80 to 100 pounds per cubic foot (pcf) or less for loosely packed lightweight aggregates as compared to 125 pcf or more for crushed stone, sand, gravel and air-cooled slag.

By the term "soil" is generally meant the thin upper layer of the unconsolidated mantle of disintegrated and decomposed rock material or regolith which overlies the consolidated bedrock and which is substantially free of organic topsoil. Generally, soil may contain gypsum fines and/or aggregates. However, in the present invention, the percentages of aggregates and/or gypsum fines that are given, include any aggregates and/or gypsum fines that may be already mixed with soil. In other words, the percentages of soil exclude gypsum fines and/or aggregate that may already be mixed within.

A stabilizing road base is prepared by substantially homogeneously mixing 30–50% by volume (preferably 35% of gypsum fines having a diameter of less than one inch (preferably less than ⅜ inch), 30–70% by volume of at least one aggregate having a diameter of less than one inch (preferably less than ⅜ inch) and 0–40% by volume of soil. More than one type of aggregate may be used to obtain the 30–70% proportion of aggregate. The gypsum fines, aggregate and soil (if soil is included) may be mixed in any order or quantity desired, as long as the resulting mixture is substantially homogeneous and contains less than 15% by volume of particles with a diameter of less than 0.02 inch in order to maintain abrasiveness of road base. In some cases, a portion of the aggregate and/or a portion of the gypsum fines may already be mixed within the soil.

At least one lignosulfonate, generally any lignosulfonate may be used, preferably having less than 30% solids in suspension (concentration) or diluted with water to obtain less than 30% solids in suspension, is admixed with the mixture of gypsum fines, aggregate and soil. The one or more lignosulfonate is substantially thoroughly admixed with the mixture in order to saturate the mixture such that the lignosulfonate generally coats or is in intimate contact with the surface of the gypsum fines, aggregate and soil. This is preferably achieved by using a lignosulfonate: mixture by volume ratio between 1:20 and 1:40.

The stabilizing road base may be prepared in various desired quantities for example, in asphalt plants, pug mills, concrete plants or concrete mixers, where substantially homogeneous mixing of the gypsum fines, aggregate and soil and further admixing of at least one lignosulfonate may be achieved. Such a road base product is then brought to the side as a "cold mix", either in bags, asphalt trucks, concrete trucks or other means, and spread onto the road substantially evenly. The stabilizing road base is then compacted by normal road traffic or tire compactor to a thickness of approximately one inch or more (preferably two to three inches) and may then be coated by spraying with at least one lignosulfonate, the latter being the same or different from the lignosulfonate admixed to the mixture.

The road base may also be prepared on site by mixing the gypsum fines, aggregate and soil (the soil may be from the existing road, having been loosened prior to or during mixing with the gypsum fines and aggregate) and then admixing the lignosulfonate.

It is preferred to windrow the mixture of gypsum fines, aggregate and soil on the road and to follow with several applications of the diluted lignosulfonate at a substantially uniform rate to saturate the mixture of gypsum fines, aggregate and soil. When the mixture is thoroughly saturated with the lignosulfonate, the windrowed material is spread evenly across the roadway with a motor grader for example, and compacted via tire compactor or highway traffic. The finished road surface may receive a final coating of at least one lignosulfonate, not necessarily the same as previously admixed with the mixture, to complete the sealing/compacting affect of the lignosulfonate/road base.

Final (finish) coating of lignosulfonate is applied preferably diluted about 2:1 to 3:1 with water. Bulk lignosulfonate is commonly shipped as 58% solids in liquid suspension.

The road mat will provide a substantially smooth, dust free and washboard free road surface with minimal road grader and water truck maintenance. After some period of time of dry conditions or heavy rain, the road surface may start to dust from traffic. The surface may be rejuvenated by a light application of water, light rainfall or spray of at least one lignosulfonate, being the same as or different from the lignosulfonate in the original road base product. The dark lignosulfonate material will move up to the surface of the mat, recoat and seal the surface two or three dozen times, extending the life of the mat several months to a year. Should the road surface develop potholes or rilling due to heavy rains, the entire mat can be road graded again to a windrow and resealed with at least one lignosulfonate and/or water and again layed out on the roadway and compacted. In areas of less than 20 inches of rainfall/year, the road mat can be expected to give up to a year of performance between applications of additional lignosulfonate to the original road base material. Also, road base's composition is of environmentally safe materials, non toxic to wildlife, water, fish and humans.

DESCRIPTION OF A PREFERRED EMBODIMENT

A stabilizing road base is prepared by substantially homogeneously mixing 35% of −⅜ inch gypsum fines and 65% of −⅜ inch aggregate (dolomite, sandstone, granite or mixture thereof). The mixture contains less than 10% of −0.02 inch particles to avoid slickness of the road base and thereby maintain a certain abrasiveness.

The mixture is thoroughly admixed with an ammonium lignosulfonate having reducing sugars between 20 and 25% of solids by volume, to saturate the mixture so as to substantially coat the gypsum fines and aggregate. The saturated mixture is substantially evenly spread over a road and compacted via tire compactor to a thickness of 2–3 inches. The compacted road base is then coated with an ammonium lignosulfonate.

After extended periods of time and weather, the road base is rejuvenated by a spraying of ammonium lignosulfonate.

The following examples will further illustrate various embodiments of the present invention. All amounts expressed are parts by volume. It is to be understood that the examples are for illustration purposes only and are not to be construed as limitations of the present invention.

EXAMPLE 1

A diluted calcium lignosulfonate product was applied to gypsum quarry haul roads by mixing with the 2–3 inches of road base via water truck/road grader application. The road base was composed of −1 inch fines reject material, comprising approximately 50% gypsum fines and 50% sandstone, from a gypsum mine's crushing/screening process. The road material was windrowed and turned several times between water-truck applications of the diluted wood liquor. When fully saturated with lignosulfonate (at a ratio of approximately 25:1 of fines to lignosulfonate), the road material was spread evenly over the roadway and compacted by vehicle traffic. A final surface coat of lignosulfonate was preferably applied. Some interesting phenomena were noted, including;

(1) a migration of dark lignosulfonate material to the surface of the road, resulting in a smooth, durable surface which could be rejuvenated by a light rain or water truck application;

(2) the gypsum fines showed a particular affinity for the lignosulfonate, retaining a portion of the latter after a hard rain and increasing the stability of the road base via compaction with decreasing moisture penetration and saturation of the road base;

(3) the mat displayed a degree of hygroscopic capacity which resulted in moisture retention in the road mat, enhancing dust control qualities;

(4) a notable quality of the road mat to resist wash-boarding and rilling, even after extended periods of time and weather without grader maintenance of the roadway;

(5) the capability for complete regrading of the roadway and subsequent regeneration of the road material via motor grader operation and consequent rejuvenation of the road mat by a light rainfall or water truck application. The migratory action of the lignosulfonate from within the mat to the surface was noted to occur literally dozens of times through the life of a single mat application.

The mat application retained reasonable dust control qualities for up to one year and superior road stabilization qualities for much longer.

Example 2

A 50:50 mixture of gypsum fines and decomposed granite gravel was used with calcium lignosulfonate on a road at 15% grade. Alone, the granite gravel is notorious for wash-boarding. The lignosulfonate mat virtually eliminated the wash-boarding problem and still retained superior roadway qualities even after the lignosulfonate had been lost to rain and snow sourced moisture. The gypsum road mat application also resulted in a 75% reduction in road grader maintenance of the roadway compared to an untreated roadway.

Example 3

As in Example 1, however, lignisite, a Georgea Pacific product from Washington State was used instead of calcium lignosulfonate. Lignisite is a lignin product previously utilized for both vanillin production and ethanol production. Consequently, all of the wood sugars have been consumed. Initial road mat results were as in Example 1, although dust control qualities were reduced and lignosulfonate retention was ineffective within six months of original application.

It is thought that the limited life term of the lignisite effectiveness is due in part to the lack of reducing sugars available, resulting in limited binding of the gypsum and subsequent early loss of the lignosulfonate due to rainfall and snow melt Example 4

Seven test plots were constructed to trial different mixtures of lignosulfonates and fines. Lignosulfonates were trialed by thoroughly mixing water diluted lignosulfonates with various mixtures of gypsum fines and sandstone fines screened to $-\frac{3}{8}$ inch. Carbonaceous sandstone (app. 18% carbonate) was utilized to mix with gypsum fines of varying proportions. The amount of lignosulfonate in each trial plot was held constant at a 20:1 ratio of fines to lignosulfonates.

The test plots were constructed with $2'' \times 4''$ sides attached to a $4' \times 8'$ sheet of $\frac{1}{2}''$ plywood bottom. The components were thoroughly mixed in a concrete mixer and poured into the forms. The web material was spread into the forms and hand tamped to attain a highly compacted 3 to $3\frac{1}{2}$ inch thick mat after drying. The drying process was complete after about two days. A normal mat application could be mixed directly on the roadway and drying time and compaction would proceed concurrently within a few hours. The test plots were subjected to either natural rainfall and/or hose watering at least three times per week, resulting in over 50 wetting/drying cycles, including some very heavy rains with a couple of all nighters. Lignosulfonate loss was noted at each wetting cycle and relative rejuvenation capacity noted. Surface characteristics noted included color (darkness), relative abrasion resistance, water percolation or shedding qualities, shrinkage, traction quality under extreme webbing (after original set), and relative hardness of mat after original set.

(1) The ammonia based lignosulfonate formulations in general show better coloration and retention qualities than other lignosulfonates, at least for the first three months of testing. This was found to be the case for three different ammonia formulations from two different manufacturers. One ammonia formulation from Chem-Liq International Inc., Danbury, CT, having a high reducing sugar content, showed superior performance over all other lignosulfonates.

(2) The optimum gypsum/sandstone fines ratio seems to be in the range of 1:2 to 1:1. The 1:2 ratio produced better test plot results than the 1:1 ratio, the sandstone fines alone or the gypsum fines alone. Preferably, keeping the gypsum fines content at 35% and the amount of particles having a diameter of less than 0.02 inch at less than 10% would also help to minimize slick road characteristics under extreme wetting, a condition that can develop under certain extreme weather resulting in loss of lignosulfonates from a roadway with a high gypsite content or high gypsum content. (Slick road conditions developed during winter after the premature loss of lignosulfonates from a roadway composed of gypsum fines alone, after several weather). The large sandstone fines component seems to improve traction under web conditions and adds abrasive resistant qualities to the mat surface.

(3) The lignosulfonate formulated specifically for water resistivity, did not show significantly different results from the calcium lignosulfonate formulations, and was less effective than the general ammonia formulations.

Having described the invention, modifications will be evident to those skilled in the art without departing from the spirit of the invention, as defined in the appended claims.

TABLE 1

| TEST PILOTS | MANUFACTURER | TRADE-NAME | COMPOSITION | GYPSUM FINES | SANDSTONE FINES |
| --- | --- | --- | --- | --- | --- |
| A | Reed Chemical Co. | WRB-1 (water-resistant) | calcium lignosulfonate | 50% | 50% |
| B | Reed Chemical Co. | Norlig A | ammonium lignosulfonate | 50% | 50% |
| C | Chem-Lig International | NH-7L | ammonium lignosulfonate | 50% | 50% |
| D | Flambeau Paper Corp. | Norlig | calcium lignosulfonate | 90% | (10% carbonate) |
| E | Reed Chemical Co. | TSSL | ammonium lignosulfonate | 35% | 65% |
| F | Reed Chemical Co. | TSSL | ammonium lignosulfonate | | 100% (18% carbonate 82% silica) |
| G | Chem-Lig International | NH-6L | ammonium lignosulfonate (reducing sugars 22.6% of solids) | 35% | 65% |

I claim:

1. A method for preparing a stabilizing road base consisting essentially of:

mixing 30-50% by volume of gypsum fines having a diameter of less than one inch, 30-70% by volume of at least one aggregate having a diameter of less than one inch and 0-40% by volume of soil to obtain a substantially homogeneous mixture of gypsum fines, aggregate and soil, said mixture having less than 15% by volume of particles with a diameter of less than 0.02 inch, admixing to said mixture at least one lignosulfonate diluted in an amount to saturate said mixture so that said at least one lignosulfonate substantially coats said gypsum fines, aggregate and soil.

2. The method as defined in claim 1 wherein said gypsum fines and said aggregate are less than 3/8 inch in diameter, said mixture has less than 10% by volume of said particles, and wherein said at least one lignosulfonate is one of the group consisting of ammonium lignosulfonate, sodium lignosulfonate and calcium lignosulfonate.

3. The method as defined in claim 1 wherein the ratio of the volume of said at least one lignosulfonate to the volume of said mixture is between 1:20 and 1:40.

4. The method as defined in claim 1 wherein said at least one aggregate is one of the group consisting of potassium containing rock material, aluminum containing rock material, silica containing rock material and carbonate containing rock material.

5. The method as defined in claim 1 wherein said at least one lignosulfonate is diluted with water to obtain less than 30% lignosulfonate concentration by volume.

6. A composition for a stabilizing road base consisting essentially of:

a substantially homogeneous mixture of 30-50% by volume of gypsum fines having a diameter of less than one inch, 30-70% by volume of at least one aggregate having a diameter of less than one inch, and 0-40% by volume of soil, said mixture having less than 15% by volume of particles with a diameter of less than 0.02 inch, said mixture saturated with at least one lignosulfonate so that said at least one lignosulfonate substantially coats said gypsum fines, said aggregate and said soil.

7. The composition as defined in claim 6 wherein said gypsum fines and said aggregate are less than 3/8 inch in diameter and said mixture has less than 10% by volume of said particles, and wherein said at least one lignosulfonate is one of the group consisting of ammonium lignosulfonate, sodium lignosulfonate and calcium lignosulfonate.

8. The composition as defined in claim 6 wherein the ratio of the volume of said lignosulfonate to the volume of said mixture of said gypsum fines, said aggregate and said soil is between 1:20 and 1:40.

9. The composition as defined in claim 6 wherein said lignosulfonate contains reducing sugars between 20 and 25% of solids by volume.

10. The composition as defined in claim 6 wherein said at least one aggregate is one of the group consisting of granite, dolomite, limestone and sandstone.

11. A method for preparing a stabilizing road base on a road consisting essentially of:

mixing 30-50% by volume of gypsum fines having a diameter of less than one inch, 30-70% by volume of at least one aggregate having a diameter of less than one inch and 0-40% by volume of soil to obtain a substantially homogeneous mixture, said mixture having less than 15% by volume of particles with a diameter of less than 0.02 inch, admixing to said mixture at least one lignosulfonate diluted in an amount to saturate said mixture so that said at least one lignosulfonate substantially coats said gypsum fines, said aggregate and said soil.

12. The method as defined in claim 11 wherein said gypsum fines and said aggregate have a diameter of less than 3/8 inch, said mixture has less than 10% by volume of said particles, said at least one lignosulfonate is one of the group consisting of ammonium lignosulfonate, calcium lignosulfonate and sodium lignosulfonate, and including substantially evenly spreading the saturated mixture across said road, and compacting the spread mixture to a thickness of 2 to 3 inches.

13. The method as defined in claim 11 and including windrowing said mixture on said road, said mixture being admixed with said at least one diluted lignosulfonate by repeatedly spraying the windrowed mixture at a generally uniform rate to saturate said windrowed mixture.

14. The method as defined in claim 11 and including evenly spreading the saturated mixture across said road, and compacting the spread saturated mixture to a thickness of at least one inch.

15. The method as defined in claim 14 and including coating the compacted mixture with at least one lignosulfonate.

16. The method as defined in claim 14 wherein said stabilizing road base is rejuvenated with at least one rejuvenator from the group consisting of lignosulfonates and water.

17. The method as defined in claim 15 wherein said stabilizing road base is rejuvenated with at least one rejuvenator from the group consisting of lignosulfonates and water.

* * * * *